United States Patent
Chiu

(10) Patent No.: US 10,060,053 B2
(45) Date of Patent: Aug. 28, 2018

(54) PROCESS FOR GAS PHASE SURFACE TREATMENT

(71) Applicant: Cytec Industries Inc., Woodland Park, NJ (US)

(72) Inventor: Shao C. Chiu, Alpharetta, GA (US)

(73) Assignee: Cytec Industries Inc., Woodland, NJ (US)

( * ) Notice: Subject to any disclaimer, the term of this patent is extended or adjusted under 35 U.S.C. 154(b) by 0 days.

(21) Appl. No.: 15/382,832

(22) Filed: Dec. 19, 2016

(65) Prior Publication Data
US 2017/0175298 A1    Jun. 22, 2017

Related U.S. Application Data

(60) Provisional application No. 62/270,656, filed on Dec. 22, 2015.

(51) Int. Cl.
| | | |
|---|---|---|
| *D01F 11/00* | (2006.01) | |
| *D01F 11/12* | (2006.01) | |
| *D01F 9/22* | (2006.01) | |

(52) U.S. Cl.
CPC .............. *D01F 11/128* (2013.01); *D01F 9/22* (2013.01); *D01F 11/122* (2013.01)

(58) Field of Classification Search
CPC ........ D01F 11/128; D01F 9/22; D01F 11/122; C01B 32/168
See application file for complete search history.

(56) References Cited

U.S. PATENT DOCUMENTS 4,009,305 A * 2/1977 Fujimaki ................ C08J 5/06
                                                          264/DIG. 19
4,608,402 A * 8/1986 Redick .................... C08K 7/06
                                                               106/478

OTHER PUBLICATIONS

Gupta, A., and I. R. Harrison. "New aspects in the oxidative stabilization of PAN-based carbon fibers: II." Carbon 35.6 (1997): 809-818.*
Nie, W. Z., J. Li, and X. H. Sheng. "Tribological properties of oxidation modified carbon fibre-reinforced polyamide 6 composites." Mater Sci-Poland 28.1 (2010): 67-75.*
Jin, Zheng, Zhiqian Zhang, and Linghui Meng. "Effects of ozone method treating carbon fibers on mechanical properties of carbon/carbon composites." Materials chemistry and physics 97.1 (2006): 167-172.*
Ko, Tse-Hao, and Tzyy-Chin Day. "The effect of pre-carbonization on the properties of PAN-based carbon fibers." Polymer composites 15.6 (1994): 401-407.*

* cited by examiner

*Primary Examiner* — Richard M Rump
(74) *Attorney, Agent, or Firm* — Thi Dang

(57) ABSTRACT

A gas phase surface treatment for treating carbon fiber including (a) exposing a carbon fiber to a gaseous oxidizing atmosphere to form a modified carbon fiber with an oxidized fiber surface; followed by (b) exposing the oxidized fiber surface to a gaseous nitrogen-containing atmosphere to form a modified carbon fiber with a nitrogen-enriched surface, wherein the nitrogen-enriched surface exhibits an increase in surface nitrogen to surface carbon (N/C) ratio as compared to the surface of the carbon fiber prior to exposure at (a). Steps (a) and (b) are carried out continuously without any additional intervening surface treatment.

18 Claims, 4 Drawing Sheets

PROCESS FOR GAS PHASE SURFACE TREATMENT

The instant application claims the benefit of prior U.S. Provisional Application No. 62/270,656 filed on Dec. 22, 2015, which is incorporated herein by reference.

FIELD

A gas phase surface treatment process is disclosed herein. In particular, a continuous gas phase surface treatment process to functionalize the surface of carbon fiber is disclosed herein.

Figure 1:
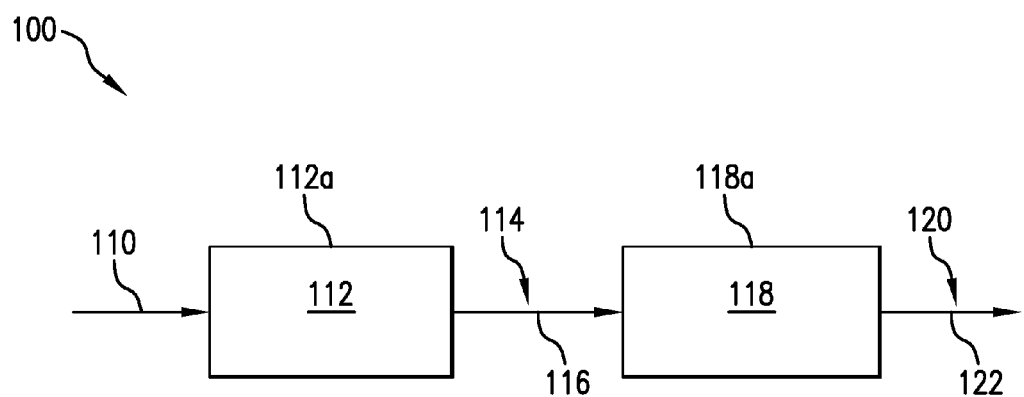
FIG. 1 is a diagram of a gas phase surface treatment according to one aspect of the present disclosure.

This, and other embodiments of the present disclosure, are described in more detail in the description below.

DETAILED DESCRIPTION

Carbon fibers have been used in a wide variety of applications because of their desirable properties, such as, for example, high strength and stiffness, chemical resistance, and low thermal expansion. In one example, carbon fibers can be formed into a structural part that combines high strength and high stiffness, while having a weight that is significantly lighter than a metal component having equivalent properties. Increasingly, carbon fibers are being used as structural components in composite materials for aerospace and automotive applications, among others. In particular, composite materials have been developed where carbon fibers serve as a reinforcing material in a resin or ceramic matrix.

In producing a composite material (i.e., a fiber-reinforced plastic), a carbon fiber in the form of a long fiber or a short fiber, or a woven fabric or a non-woven fabric, is used in combination with a matrix of a synthetic resin. Resins suitable for such a matrix are generally known to those skilled in the art and include thermoplastic resins such as polyacetals, polyamides, polyesters, acrylic resins, fluoro resins, polyvinylchloride resins, and the like, and thermosetting resins such as epoxys, phenolics, polyimides, and the like. Such composite materials are versatile and may be used in a structural material, a heat-resistant material, an electrically-conductive material, or a friction resistant material. However, difficulties have been encountered in that carbon fiber has, in general, poor affinity for a synthetic resin, so that when mixed with a synthetic resin, it is difficult to obtain a composite material having satisfactory physical or mechanical properties. Accordingly, it is common practice in the production of the composite material to pre-treat the surface of a carbon fiber in an effort to improve the affinity of the carbon fiber for a synthetic resin.

Conventional carbon fiber surface treatment employs the use of an electrochemical method, in which the carbon fiber is treated in an electrolyte bath. Depending on the type of electrolyte and current of the electricity, surface functionalities of oxygen containing type or nitrogen containing type, are formed. Conventional carbon fiber surface treatment requires washing and drying, which result in extra expense due to equipment installation and operation. Gas phase surface treatment (GPST) does not require the subsequent washing and drying steps; however, the GPST processes currently known are limited to the use of oxidative gas, resulting in insufficient nitrogen containing functionality, which is needed for the interaction between fiber and certain high performance matrix resins.

Accordingly, there is a need in the art to produce a modified carbon fiber to improve the surface nitrogen functionality of the carbon fiber.

The processes disclosed herein are believed to be an answer to needs experienced in the art.

One aspect of the present disclosure is pertaining to a gas phase surface treatment for treating carbon fiber, comprising: a) exposing a carbon fiber to a gaseous oxidizing atmosphere to form a modified carbon fiber with an oxidized fiber surface; followed by b) exposing the oxidized fiber surface to a gaseous nitrogen-containing atmosphere to form a modified carbon fiber with a nitrogen-enriched surface, wherein the nitrogen-enriched surface exhibits an increase in surface nitrogen to surface carbon (N/C) ratio as compared to the surface of the carbon fiber prior to exposure at (a), wherein steps (a) and (b) are carried out continuously without any additional intervening surface treatment.

Another aspect of the present disclosure pertains to a continuous process for manufacturing carbon fiber comprising: (i) passing a continuous polyacrylonitrile (PAN) fiber through an oxidation zone to form a stabilized PAN fiber; (ii) passing the stabilized PAN fiber through a carbonization zone to form a continuous carbon fiber; (iii) exposing the continuous carbon fiber to a gaseous oxidizing atmosphere to form modified carbon fiber with an oxidized fiber surface; and (iv) exposing the oxidized fiber surface to a gaseous nitrogen-containing atmosphere to form a modified carbon fiber with a nitrogen-enriched surface, wherein the nitrogen-enriched surface exhibits an increase in surface nitrogen to surface carbon (N/C) ratio as compared to the surface of the carbon fiber prior to exposure at (iii), wherein steps (i) to (iv) or steps (ii) to (iv) are carried out continuously.

Gas phase surface treatment (GPST) for treating carbon fiber has been found to improve the interface property between carbon fiber and matrix resin without changing the weight and strength of the fiber. Thus, gas phase surface treatment enhances interfacial adhesion in the manufacture of composite materials utilizing carbon fibers. Disclosed herein is a gas phase surface treatment for treating carbon fiber that is a continuous method without any additional intervening surface treatment to produce a carbon fiber having a modified surface that enhances the affinity towards a matrix resin for producing a composite. It is noted that ranges of numerical values disclosed throughout the application, e.g., concentrations, temperatures, times, amounts, etc., include the specified end values and all values, and ranges of values, in between the specified end values. Also, examples of particular components, systems, and/or apparatus that are provided herein are examples only and are not meant to limit a component, system, and/or apparatus to the particular example provided.

The present disclosure encompasses gas phase surface treatment of a previously manufactured carbon fiber as well as a process that results in the production of a carbon fiber and the gas phase surface treatment thereof.

According to an embodiment shown in FIG. 1, during a gas phase surface treatment 100 of a carbon fiber 110, the carbon fiber 110 is exposed to a gaseous oxidizing atmosphere 112 to form a modified carbon fiber 114 with an oxidized fiber surface 116. In this step of the gas phase surface treatment, only the surface of the carbon fiber is modified and the interior of the fiber is not modified. This step is followed by exposing the oxidized fiber surface 116 to a gaseous nitrogen-containing atmosphere 118 to form a modified carbon fiber 120 with a nitrogen-enriched surface 122. In this step of the gas phase surface treatment, only the surface of the carbon fiber is modified and the interior of the fiber is not modified. The nitrogen-enriched surface 122 exhibits an increase in surface nitrogen to surface carbon (N/C) ratio as compared to the surface of the carbon fiber 110 prior to exposure to the gaseous oxidizing atmosphere 112. These steps are carried out continuously without any additional intervening surface treatment.

The gas phase surface treatment disclosed herein may be carried out in apparatus/systems that are known in the art and commonly employed in the surface treatment of carbon fibers; however, it is within the scope of the present disclosure to conduct the gas phase surface treatment in apparatus/systems that are specifically developed for the treatment disclosed herein. For example, the exposure of the carbon fiber to the gaseous oxidizing atmosphere can be done in any manner known for such an exposure. The carbon fiber 110 may be exposed to the gaseous oxidizing atmosphere 112 in a chamber 112a, such as a tube, pipe, rectangular box, or chest (herein collectively referred to as a "chamber").

The gaseous oxidizing atmosphere 112 includes ozone and at least one gaseous component selected from air, oxygen, nitrogen oxide, and a combination thereof. In one embodiment, the gaseous oxidizing atmosphere 112 includes ozone and oxygen. The ozone may be manufactured by an ozone generator (not shown in FIG. 1) and fed, along with the at least one gaseous component, to the chamber 112a to expose the carbon fiber to the gaseous oxidizing atmosphere 112. The concentration of the ozone in the gaseous oxidizing atmosphere may vary, however, in one embodiment, the gaseous oxidizing atmosphere 112 includes at least 1000 ppm of ozone. In another embodiment, the gaseous oxidizing atmosphere 112 includes at least 2000 ppm of ozone.

Exposure of the carbon fiber 110 to the gaseous oxidizing atmosphere 112 can be performed at any temperature sufficient for surface oxidation. In one embodiment, the exposure of the carbon fiber to the gaseous oxidizing atmosphere is performed at a temperature in the range of about 100 degrees Celsius (° C.) to about 200° C. In another embodiment, the exposure of the carbon fiber 110 to the gaseous oxidizing atmosphere 112 is performed at a temperature in the range of about 120° C. to about 160° C.

Exposure of the carbon fiber 110 to the gaseous oxidizing atmosphere 112 can be carried out for any length of time sufficient for obtaining the required surface oxidation. In one embodiment, the exposure of the carbon fiber 110 to the gaseous oxidizing atmosphere 112 is carried out for a period of about 0.5 minutes to about 2 minutes, i.e., the gaseous oxidizing atmosphere 112 is provided to the chamber 112a at a constant rate and the fiber stays in the chamber 112a in an amount of time in the range of about 0.5 minutes to about 2 minutes.

Exposure of the carbon fiber 110 to the gaseous oxidizing atmosphere 112 forms a modified carbon fiber 114 with an oxidized fiber surface 116. After forming the modified carbon fiber 114 having an oxidized fiber surface 116, the fiber is passed to another chamber (e.g., chamber 118a) and the oxidized fiber surface 116 is exposed to the gaseous nitrogen-containing atmosphere 118. Exposure of the oxidized fiber surface to the gaseous nitrogen-containing atmosphere 118 forms a modified carbon fiber 120 with a nitrogen-enriched surface 122.

The gaseous nitrogen-containing atmosphere 118 that the oxidized fiber surface 116 is exposed to may be any such nitrogen-containing atmosphere that is known in the art. In one embodiment, the gaseous nitrogen-containing atmosphere 118 includes a gaseous component selected from ammonia, methylamine, dimethylamine, trimethylamine, ethylamine, and a combination thereof. In one embodiment, the gaseous component in the nitrogen-containing atmosphere 118 is ammonia. While the volume or concentration of the gaseous component in the nitrogen-containing atmosphere 118 may vary, in one embodiment, the nitrogen-containing atmosphere 118 includes at least 50% by volume of ammonia gas.

Exposure of the oxidized fiber surface 116 to the gaseous nitrogen-containing atmosphere 118 can be performed at any temperature effective for forming a nitrogen-enriched surface. In one embodiment, the exposure of the oxidized fiber surface to the gaseous nitrogen-containing atmosphere 118 is performed at a temperature in the range of about 100 degrees Celsius (° C.) to about 200° C. In another embodiment, the exposure of the oxidized fiber surface 116 to the gaseous nitrogen-containing atmosphere 118 is performed at a temperature in the range of about 120° C. to about 160° C.

Exposure of the oxidized fiber surface 116 to the gaseous nitrogen-containing atmosphere 118 can be carried out for any length of time sufficient for forming the desired nitrogen-enriched surface. In one embodiment, the exposure of the oxidized fiber surface 116 to the gaseous nitrogen-containing atmosphere 118 is carried out for a period of about 0.5 minutes to about 2 minutes, i.e., the gaseous nitrogen-containing atmosphere 118 is provided to the chamber 118a at a constant rate and the fiber stays in the chamber 118a in an amount of time in the range of about 0.5 minutes to about 2 minutes.

It is contemplated that each of the above-described steps of the gas phase surface treatment can be performed at the same temperature, or within the same temperature range. That is, exposure of the carbon fiber 110 to the gaseous oxidizing atmosphere 112 and exposure of the oxidized fiber surface 116 to the gaseous nitrogen-containing atmosphere 118 can each be performed at a temperature in the range of about 100° C. to about 200° C., or in a temperature in the range of 120° C. to 160° C. Likewise, it is contemplated that the above-described steps are performed at different temperatures, e.g., exposure of the carbon fiber 110 to the gaseous oxidizing atmosphere 112 can be performed at 100° C. while exposure of the oxidized fiber surface 116 to the gaseous nitrogen-containing atmosphere 118 can be performed at 160° C. Other temperature combinations are contemplated and are within the scope of the present disclosure.

It is further contemplated that each of the above-described steps of the gas phase surface treatment can carried out for the same period of time, or within the same time period range. That is, exposure of the carbon fiber 110 to the gaseous oxidizing atmosphere 112 and exposure of the oxidized fiber surface 116 to the gaseous nitrogen-containing atmosphere 118 can each be carried out for a period of 0.5 to 2 minutes. Likewise, it is contemplated that the above-described steps are carried out for different lengths of time. It is noted that the length of time that the fiber spends in the chamber depends on the length of the chamber. Therefore, it is contemplated that exposure of the carbon fiber 110 to the gaseous oxidizing atmosphere 112 may be at a length of time that is different from the length of time of the exposure of the oxidized fiber surface 116 to the gaseous nitrogen-containing atmosphere 118.

Figure 3:
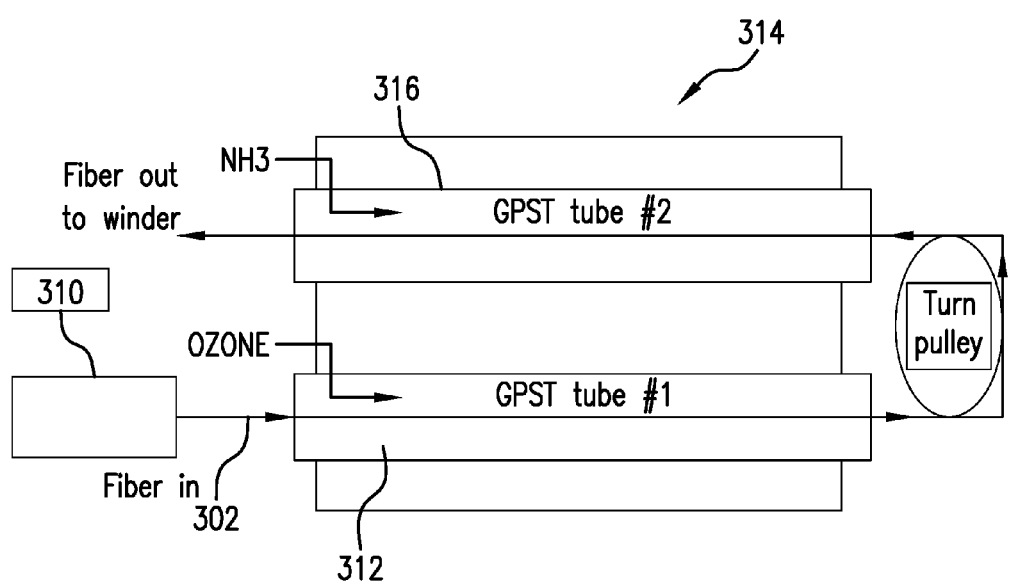
FIG. 3 is a diagram of a gas phase surface treatment according to one aspect of the present disclosure.

As shown in FIG. 1, the gas phase surface treatment may be conducted such that there are two separate chambers 112a, 118a. However, it is contemplated that the carbon fiber may be exposed to the gaseous oxidizing atmosphere 112 and a gaseous nitrogen-containing atmosphere 118 in separate tubes, where both tubes are placed in a single chamber. Such an embodiment is shown in FIG. 3, which is discussed in detail below. Other configurations of the gas phase surface treatment, while not shown, are encompassed within the present disclosure.

The gas phase surface treatment disclosed herein results in a carbon fiber having a nitrogen-enriched surface (also referred to herein as "a modified carbon fiber with a nitrogen-enriched surface"). The nitrogen-enriched surface exhibits an increase in surface nitrogen to surface carbon (N/C) ratio as compared to the surface of the carbon fiber prior to exposure of the gaseous oxidizing atmosphere. Measurement of the N/C ratio may be performed by methods known in the art, such as, for example, X-ray photoelectron spectroscopy (XPS). In one embodiment, the increase in N/C ratio is at least 30% as measured by XPS.

In one embodiment, the N/C ratio of the nitrogen-enriched surface is in the range of 0.05-0.07 as measured by XPS.

The above-described steps of the surface treatment are carried out continuously, without any additional intervening surface treatment either before exposure to the gaseous oxidizing atmosphere 112, or after exposure to the gaseous oxidizing atmosphere 112. In particular, the above-described steps are carried out continuously and without intervening steps after a fiber is carbonized. In one embodiment, the exposure to the gaseous oxidizing atmosphere 112 and the exposure to the gaseous nitrogen-containing atmosphere are performed immediately 118, without any intervening step, after carbonization of a stabilized polyacrylonitrile (PAN) fiber precursor to produce the carbon fiber.

Figure 2:
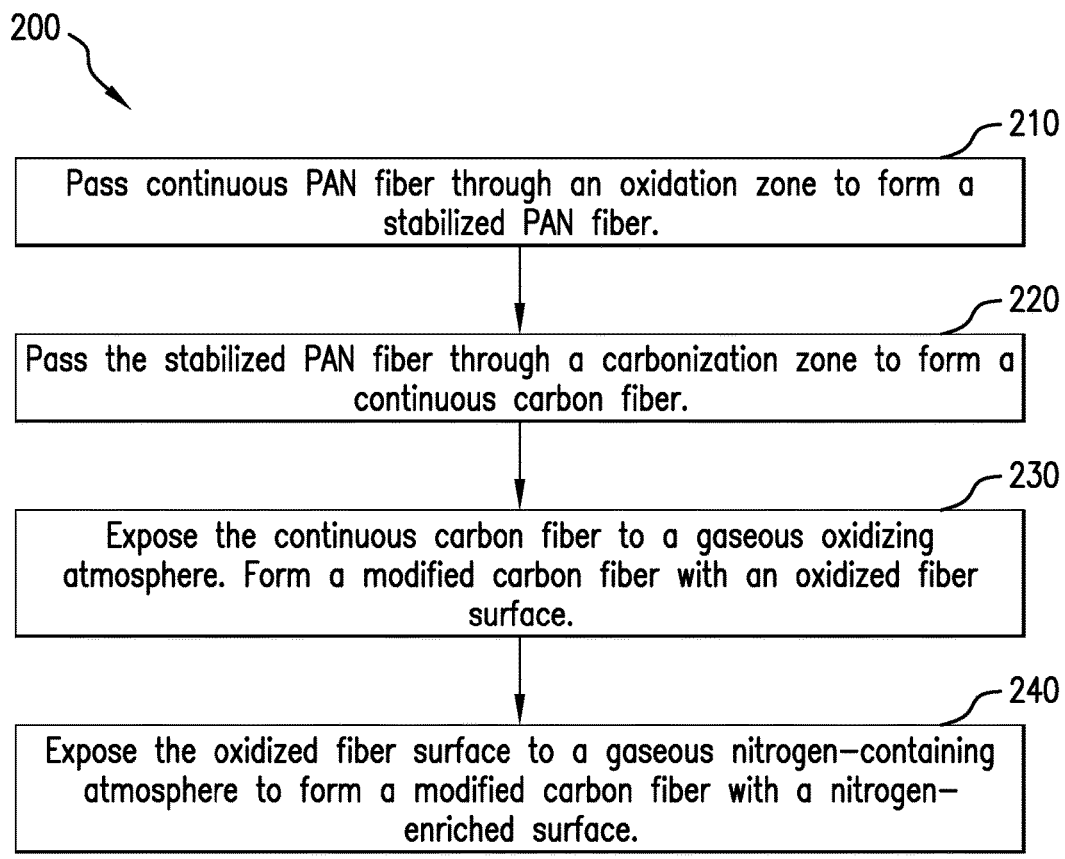
FIG. 2 is a flow chart of a process for manufacturing a carbon fiber according to one aspect of the present disclosure.

According to an embodiment shown in FIG. 2, there is a continuous process 200 for manufacturing a carbon fiber. The process includes, in step 210, passing a continuous PAN fiber through an oxidation zone to form a stabilized PAN fiber. In one embodiment, the oxidation zone includes an oven that is configured to enclose the PAN fiber in air. The oven used in the oxidation zone of step 210 may be maintained at any temperature. In one embodiment, the oven used in the oxidation zone is maintained at temperature in the range of 200° C. to 300° C.

The stabilized PAN fiber is passed through a carbonization zone in step 220 to form a continuous carbon fiber. The carbonization zone may be set-up in any suitable format as known in the art. In one embodiment, the carbonization zone in step 220 includes one or more furnaces. Each furnace in the carbonization zone encloses a gaseous atmosphere that includes at least 99% by volume of an inert gas, with the remaining atmosphere including, e.g., trace air or water moisture or off-gas, like CO. The furnace(s) of the carbonization zone in step 220 is/are maintained at a temperature in the range of 300° C. to 1650° C.

It is contemplated that the carbonization zone in step 220 includes, in one embodiment, a pre-carbonization furnace and a carbonization furnace. In one embodiment, the pre-carbonization furnace is maintained at a temperature in the range of 300° C. to 900° C. and the carbonization furnace is maintained at a temperature in the range of 700° C. to 1650° C.

In step 230, the continuous fiber is exposed to a gaseous oxidizing atmosphere to form a modified carbon fiber with an oxidized fiber surface. The oxidized fiber surface is exposed to a gaseous nitrogen-containing atmosphere to form a modified carbon fiber with a nitrogen-enriched surface in step 240. Steps 230 and 240 are carried out in accordance with the gas phase treatment as described above.

In continuous process 200, steps 210 to 240 are carried out continuously and steps 230 and 240 are carried out without any additional intervening surface treatment.

The nitrogen-enriched surface formed in step 240 exhibits an increase in surface nitrogen to surface carbon (N/C) ratio as compared to the surface of the carbon fiber prior to the exposure at step 230. Measurement of the N/C ratio may be performed by methods known in the art, such as, for example, X-ray photoelectron spectroscopy (XPS). In one embodiment, the increase in N/C ratio is at least 30% as measured by XPS.

In one embodiment, the N/C ratio of the nitrogen-enriched surface formed in step 240 is in the range of 0.05-0.07 as measured by XPS.

In addition to the foregoing, the present disclosure encompasses, but is not limited to, the following embodiments:

Embodiment 1

A gas phase surface treatment for treating carbon fiber, comprising:
 a) exposing a carbon fiber to a gaseous oxidizing atmosphere to form a modified carbon fiber with an oxidized fiber surface; followed by
 b) exposing the oxidized fiber surface to a gaseous nitrogen-containing atmosphere to form a modified carbon fiber with a nitrogen-enriched surface, wherein the nitrogen-enriched surface exhibits an increase in surface nitrogen to surface carbon (N/C) ratio as compared to the surface of the carbon fiber prior to exposure at (a),
 wherein steps (a) and (b) are carried out continuously without any additional intervening surface treatment.

Embodiment 2

The gas phase surface treatment of embodiment 1 wherein, the increase in N/C ratio is at least 30% as measured by X-ray photoelectron spectroscopy (XPS).

Embodiment 3

The gas phase surface treatment of embodiment 1 wherein, the N/C ratio of the nitrogen-enriched surface is in the range of 0.05-0.07 as measured by X-ray photoelectron spectroscopy (XPS).

Embodiment 4

The gas phase surface treatment according to any one of the preceding embodiments, wherein steps (a) and (b) are performed immediately, without any intervening step, after carbonization of a stabilized polyacrylonitrile (PAN) fiber precursor to produce said carbon fiber.

Embodiment 5

The gas phase surface treatment according to any one of the preceding embodiments, wherein the gaseous oxidizing atmosphere comprises ozone and at least one gaseous component selected from: air, oxygen, nitrogen oxide, and combination thereof.

Embodiment 6

The gas phase surface treatment according to any one of the preceding embodiments, wherein the gaseous oxidizing atmosphere comprises at least 1000 ppm of ozone.

Embodiment 7

The gas phase surface treatment according to any one of the preceding embodiments, wherein the nitrogen-containing gas comprises a gaseous component selected from: ammonia, methylamine, dimethylamine, trimethylamine, ethylamine and combination thereof.

Embodiment 8

The gas phase surface treatment according to any one of the preceding embodiments, wherein the gaseous nitrogen-containing atmosphere comprises at least 50% by volume of ammonia gas.

Embodiment 9

The gas phase surface treatment according to any one of the preceding embodiments, wherein step (a) is carried out for a period of 0.5-2 minutes, and step (b) is carried out for a period of 0.5-2 minutes.

Embodiment 10

The gas phase surface treatment according to any one of the preceding embodiments, wherein steps (a) and (b) are performed at a temperature in the range of about 100° C. to about 200° C.

Embodiment 11

The gas phase surface treatment of embodiment 10, wherein steps (a) and (b) are performed at a temperature in the range of 120° C. to 160° C.

Embodiment 12

A continuous process for manufacturing carbon fiber comprising:
i. passing a continuous polyacrylonitrile (PAN) fiber through an oxidation zone to form a stabilized PAN fiber;
ii. passing the stabilized PAN fiber through a carbonization zone to form a continuous carbon fiber;
iii. exposing the continuous carbon fiber to a gaseous oxidizing atmosphere to form a modified carbon fiber with an oxidized fiber surface; and
iv. exposing the oxidized fiber surface to a gaseous nitrogen-containing atmosphere to form a modified carbon fiber with a nitrogen-enriched surface, wherein the nitrogen-enriched surface exhibits an increase in surface nitrogen to surface carbon (N/C) ratio as compared to the surface of the carbon fiber prior to exposure at (iv),
v. wherein steps (i) to (iv) or steps (ii) to (iv) are carried out continuously.

Embodiment 13

The continuous process of embodiment 12, wherein N/C ratio of the nitrogen-enriched surface is in the range of 0.05-0.07 as measured by X-ray photoelectron spectroscopy (XPS).

Embodiment 14

The continuous process of embodiment 12, wherein the increase in N/C ratio is at least 30%.

Embodiment 15

The continuous process according to any one of embodiments 12 to 14, wherein the gaseous oxidizing atmosphere comprises ozone and at least one gaseous component selected from: air, oxygen, nitrogen oxide, and combination thereof.

Embodiment 16

The continuous process according to any one of embodiments 12 to 15, wherein the gaseous oxidizing atmosphere comprises at least 1000 ppm of ozone.

Embodiment 17

The continuous process according to any one of embodiments 12 to 16, wherein the nitrogen-containing gas comprises a gaseous component selected from: ammonia, methylamine, dimethylamine, trimethylamine, ethylamine and combination thereof.

Embodiment 18

The continuous process according to any one of embodiments 12 to 17, wherein the gaseous nitrogen-containing atmosphere comprises at least 50% by volume of ammonia gas.

Embodiment 19

The continuous process according to any one of embodiments 12 to 19, wherein the oxidation zone at (i) comprises an oven configured to enclose the fiber in air.

Embodiment 20

The continuous process of embodiment 19, wherein the oven of the oxidation zone is maintained at a temperature in the range of 200° C.-300° C.

Embodiment 21

The continuous process according to any one of embodiments 12 to 20, wherein the carbonization zone at (ii) comprises one or more furnace(s), each enclosing a gaseous atmosphere comprising at least 99% by volume of an inert gas.

Embodiment 22

The continuous process of embodiment 21, wherein the one or more furnace(s) of the carbonization zone is/are maintained at a temperature in the range of 300° C.-1650° C.

Embodiment 23

The continuous process of embodiment 21, wherein the carbonization zone at (ii) comprises a pre-carbonization furnace maintained at a lower temperature in the range of 300° C.-900° C. and a carbonization furnace maintained at a higher temperature in the range of 700° C.-1650° C.

Some or all of the above-described embodiments are shown in described in one or more of the Examples provided below.

EXAMPLES

Results obtained by the inventor utilizing the novel process disclosed herein demonstrate improvements over the processes known in the art. Although the particularly exemplified tests utilized ozone as the gaseous oxidizing atmosphere and ammonia as the gaseous nitrogen-containing atmosphere, the inventor expects similar results from other gaseous atmospheres as disclosed herein.

In particular, and as demonstrated below, the results show that ozone treatment (i.e., exposure of the fiber to ozone) can oxidize a carbonized fiber surface to produce oxygen surface functionality. Subsequent ammonia treatment (i.e., exposure of the fiber to ammonia) can introduce nitrogen surface functionality. Without the ozone treatment, the inventor found that ammonia treatment alone was not effective.

The novel process according to the Examples disclosed herein, was conducted on carbon fiber immediately after it exited a carbonization furnace (which is known to one skilled in the art). The parameters and results are discussed below.

Equipment

A gas phase surface treatment was used to do in-line surface treatment on carbon fiber at the exit of the carbonization furnace as shown in FIG. 3. As shown in FIG. 3 a carbonized fiber 302 is fed directly from the carbonization furnace 310 to a gas tube 312 situated in a chamber 314. The fiber 302 is exposed to ozone in the gas tube 312. The chamber 314 was heated at a temperature of 150° C. After being exposed to ozone, the fiber 302 was returned to a second gas tube 316 in the heated chamber 314. In the second tube 316, the fiber is exposed to ammonia gas. Each tube shown in FIG. 3 was eight (8) feet in length and had a diameter of 1.5 inches.

The ozone was generated by using an ozone generator (not shown) manufactured by OZOTECH Inc., Model OZ2PCS. The feed gas provided to the ozone generator was oxygen. The ammonia gas was fed to the tube from a gas cylinder (not shown).

Materials

An intermediate modulus (IM) carbon fiber was made and used in the experiments described below. The PAN polymer dope used for the IM fiber was polymerized in dimethyl sulfoxide (DMSO). The polymer had 1% itaconic acid (ITA) and had a weight average molecular weight ($M_w$) of about 150,000. The spinning dope had a solid concentration of about 22%. The PAN precursor spinning was performed by an air gap spinning method.

Oxidation of the PAN fiber during manufacture of the carbon fiber was done in air inside an oxidation oven set at 210° C. to 290° C. Carbonization during manufacture of the carbon fiber was done in nitrogen at six (6) feet per minute (f.p.m.) line speed and the maximum carbonization furnace temperature was set at 1300° C.

Procedure and Results

Unsized carbon fiber samples were collected for surface chemistry analysis by XPS. The XPS analysis was done at the Composite Center of the Michigan State University.

A. Comparison Between Untreated Sample Fiber and Ozone/Ammonia Treated Sample Fiber Surface chemistry tests of four (4) samples were conducted. The first sample (Sample 1) was not exposed to a gaseous oxidizing atmosphere (ozone) or a gaseous nitrogen-containing atmosphere (ammonia).

The second sample of fiber (Sample 2) was exposed to ozone only. In Sample 2, the carbon fiber was sent from the carbonization furnace to the gas tube filled with ozone containing oxygen. The gas tube was placed in a heated chamber set to a temperature of 150° C. The ozone concentration in the gas tube was at 2000 ppm. The residence time of the fiber in the oxidizing gas tube was 80 seconds. The fiber was not subsequently exposed to ammonia.

The third sample of fiber (Sample 3) was exposed to ozone and ammonia. In Sample 3, the carbon fiber was sent from the carbonization furnace to the gas tube filled with ozone containing oxygen. The gas tube was placed in a heated chamber set to a temperature of 150° C. The ozone concentration in the gas tube was at 2000 ppm. The residence time of the fiber in the oxidizing gas tube was 80 seconds. The carbon fiber was then sent to a gas tube filled with ammonia. The ammonia gas tube was placed in a heated chamber set to a temperature of 150° C. The residence time of the fiber in the ammonia gas tube was 80 seconds. 100% ammonia was fed from the gas cylinder to the ammonia gas tube.

The fourth sample of fiber (Sample 4) was exposed to ammonia only. In Sample 4, the carbon fiber was sent from the carbonization furnace to the gas tube filled with ammonia. The ammonia gas tube was placed in the heated chamber set to a temperature of 150° C. The residence time of the fiber in the ammonia gas tube was 80 seconds. 100% ammonia was fed from the gas cylinder to the ammonia gas tube.

Figure 4:
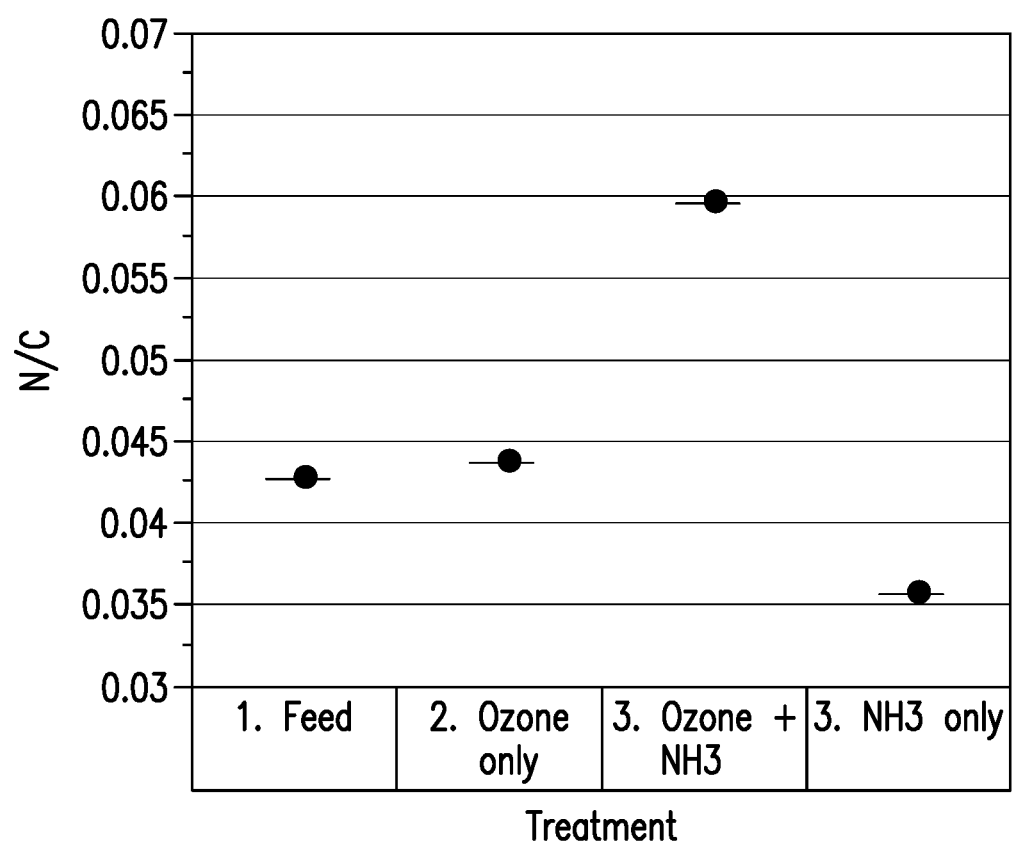
FIG. 4 is a chart showing the nitrogen to carbon ratio samples according to the Examples described herein.

Table 3 below demonstrates the surface chemistry data of the fiber samples as measured by XPS. FIG. 4 is a chart that shows the nitrogen/carbon (N/C) ratio of the samples. As can be seen, the N/C ratio of the carbon fiber exposed to both ozone and ammonia (Sample 3) is increased as compared to the N/C ratio of the carbon fiber not exposed to anything (Sample 1), the sample exposed to ozone only (Sample 2), and the sample exposed to ammonia only (Sample 4).

TABLE 3

| Surface Chemistry Data as Measure by XPS | | | | | | |
| --- | --- | --- | --- | --- | --- | --- |
| Sample | Treatment | Carbon | Nitrogen | Oxygen | Silicon | N/C |
| 1 | Feed | 85.85 | 3.72 | 7.87 | 2.56 | 0.043 |
| 2 | Ozone Only | 78.33 | 3.41 | 15.83 | 2.43 | 0.044 |
| 3 | Ozone and Ammonia | 77.47 | 4.61 | 14.21 | 2.67 | 0.060 |
| 4 | Ammonia Only | 88.44 | 3.14 | 6.62 | 1.80 | 0.036 |

Table 3 and FIG. 4 demonstrate that ozone treatment created surface oxygen, ozone and ammonia treatment created surface oxygen and surface nitrogen, and that ammonia treatment by itself did not change the carbon fiber surface chemistry.

Although this present disclosure has been shown and described with respect to the detailed embodiments thereof, it will be understood by those of skill in the art that various changes may be made and equivalents may be substituted for elements thereof without departing from the scope of the present disclosure. In addition, modifications may be made to adapt a particular situation or material to the teachings of the present disclosure without departing from the essential scope thereof. Therefore, it is intended that the present disclosure not be limited to the particular embodiments disclosed in the above detailed description, but that the present disclosure will include all embodiments falling within the scope of the appended claims.

The invention claimed is:

1. A gas phase surface treatment for treating a continuous carbon fiber, comprising:
 a) exposing a moving continuous carbon fiber to a gaseous oxidizing atmosphere to form a modified carbon fiber with an oxidized fiber surface; followed by
 b) exposing the moving continuous carbon fiber with the oxidized fiber surface to a gaseous nitrogen-containing atmosphere comprising at least 50% by volume of ammonia gas to form a modified carbon fiber with a nitrogen-enriched surface, wherein the nitrogen-enriched surface exhibits an increase in surface nitrogen to surface carbon (N/C) ratio as compared to the surface of the carbon fiber prior to exposure at (a),
 wherein steps (a) and (b) are carried out continuously without any additional intervening surface treatment,
 wherein step (a) is carried out for a period of 0.5-2 minutes, and step (b) is carried out for a period of 0.5-2 minutes.

2. The gas phase surface treatment of claim 1 wherein, the increase in N/C ratio is at least 30% as measured by X-ray photoelectron spectroscopy (XPS).

3. The gas phase surface treatment of claim 1 wherein, the N/C ratio of the nitrogen-enriched surface is in the range of 0.05-0.07 as measured by X-ray photoelectron spectroscopy (XPS).

4. The gas phase surface treatment according to claim 1, wherein steps (a) and (b) are performed immediately, without any intervening step, after carbonization of a stabilized polyacrylonitrile (PAN) fiber precursor to produce said carbon fiber.

5. The gas phase surface treatment according to claim 1, wherein the gaseous oxidizing atmosphere comprises ozone and at least one gaseous component selected from: air, oxygen, nitrogen oxide, and combination thereof.

6. The gas phase surface treatment according to claim 1, wherein the gaseous oxidizing atmosphere comprises at least 1000 ppm of ozone.

7. The gas phase surface treatment according to claim 1, wherein steps (a) and (b) are performed at a temperature in the range of about 100° C. to about 200° C.

8. The gas phase surface treatment of claim 7, wherein steps (a) and (b) are performed at a temperature in the range of 120° C. to 160° C.

9. A continuous process for manufacturing carbon fiber comprising:
 i. passing a continuous polyacrylonitrile (PAN) fiber through an oxidation zone to form a stabilized PAN fiber;
 ii. passing the stabilized PAN fiber through a carbonization zone to form a continuous carbon fiber;
 iii. exposing the continuous carbon fiber to a gaseous oxidizing atmosphere to form a modified carbon fiber with an oxidized fiber surface; and
 iv. exposing the oxidized fiber surface to a gaseous nitrogen-containing atmosphere comprising at least 50% by volume of ammonia gas to form a modified carbon fiber with a nitrogen-enriched surface, wherein the nitrogen-enriched surface exhibits an increase in surface nitrogen to surface carbon (N/C) ratio as compared to the surface of the carbon fiber prior to exposure at (iii),
 wherein steps (i) to (iv) or steps (ii) to (iv) are carried out continuously,
 wherein step (iii) is carried out for a period of 0.5-2 minutes, and step (iv) is carried out for a period of 0.5-2 minutes.

10. The continuous process of claim 9, wherein N/C ratio of the nitrogen-enriched surface is in the range of 0.05-0.07 as measured by X-ray photoelectron spectroscopy (XPS).

11. The continuous process of claim 9, wherein the increase in N/C ratio is at least 30%.

12. The continuous process according to claim 9, wherein the gaseous oxidizing atmosphere comprises ozone and at least one gaseous component selected from: air, oxygen, nitrogen oxide, and combination thereof.

13. The continuous process according to claim 9, wherein the gaseous oxidizing atmosphere comprises at least 1000 ppm of ozone.

14. The continuous process according to claim 9, wherein the oxidation zone at (i) comprises an oven configured to enclose the continuous PAN fiber in air.

15. The continuous process of claim 14, wherein the oven of the oxidation zone is maintained at a temperature in the range of 200° C.-300° C.

16. The continuous process according to claim 9, wherein the carbonization zone at (ii) comprises one or more furnace(s), each enclosing a gaseous atmosphere comprising at least 99% by volume of an inert gas.

17. The continuous process of claim 16, wherein the one or more furnace(s) of the carbonization zone is/are maintained at a temperature in the range of 300° C.-1650° C.

18. The continuous process of claim 16, wherein the carbonization zone at (ii) comprises a pre-carbonization furnace maintained at a lower temperature in the range of 300° C.-900° C. and a carbonization furnace maintained at a higher temperature in the range of 700° C.-1650° C.

* * * * *